3,155,649
BENZOTHIAZOCINONES, RELATED COMPOUNDS AND THEIR PREPARATION
John Krapcho, Somerset, and Chester F. Turk, Elizabeth, N.J., assignors to Olin Mathieson Chemical Corporation, New York, N.Y., a corporation of Virginia
No Drawing. Filed July 11, 1962, Ser. No. 209,235
6 Claims. (Cl. 260—239.3)

This invention relates to benzothiazocinones and related compounds. More particularly the invention relates to bases of the formula (I) 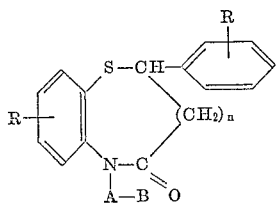

and acid addition salts of such bases.

The symbols in Formula I have the following meanings: R represents hydrogen, lower alkyl, lower alkoxy, nitro, halo or trihalomethyl; A represents lower alkylene; B represents a basic nitrogen containing radical of less than 12 carbon atoms; and $n$ represents the integers 2, 3 or 4.

The lower alkyl groups represented by R include straight and branched chain saturated aliphatic groups such as methyl, ethyl, propyl, isopropyl, butyl, isobutyl, t-butyl, amyl, isoamyl, hexyl and the like. Methyl and ethyl are preferred. The lower alkoxy groups contain alkyl groups of the same character attached to the oxygen atom. Similarly, the lower alkylene groups represented by A are divalent radicals of the same kind. Each of the four halogens is contemplated by the terms "halo" and "trihalomethyl," but in the case of the halogens themselves chlorine and bromine are preferred while trifluoromethyl is the preferred trihalomethyl group.

The basic nitrogen containing radicals symbolized by B may be represented by the formula (II) 

wherein each $R_1$ represents hydrogen, lower alkyl, hydroxy-lower alkyl, phenyl-lower alkyl and N-(lower alkyl) phenyl(lower alkyl) forming such basic group as amino, lower alkylamino e.g. methylamino, ethylamino, di(lower alkyl)amino, e.g. dimethylamino, diethylamino, dipropylamino, (hydroxy-lower alkyl)amino, e.g. hydroxyethylamino, di(hydroxy-lower alkyl)amino, e.g. di(hydroxyethyl)amino, phenyl(lower alkyl)amino, e.g. benzylamino, phenethylamino, N(lower alkyl)phenyl(lower alkyl)amino, e.g. N-methylbenzylamino, and the like. In addition the nitrogen may join with the groups represented by $R_1$ to form a 5 to 7 membered monocyclic heterocyclic containing, if desired, an oxygen, sulfur or an additional nitrogen atom, that is, the two symbols $R_1$ represent together a tetramethylene, pentamethylene, hexamethylene, oxytrimethylene, oxytetramethylene, azatrimethylene, azatetramethylene, azapentamethylene, thiatrimethylene or thiatetramethylene. The heterocyclic group may also be substituted by one or two groups represented by R.

Thus heterocyclic groups represented by B include, for example, piperidino, (lower alkyl)piperidino, e.g. methylpiperidino, di(lower alkyl)piperidino, e.g. dimethylpiperidino, (lower alkoxy)piperidino, e.g. methoxypiperidino, 2-, 3- or 4-piperidyl, 2-, 3- or 4-(N-lower alkylpiperidyl), e.g. 2-, 3- or 4-(N-methylpiperidyl)pyrrolidino, (lower alkyl)pyrrolidino, e.g. methylpyrrolidino, di(lower alkyl)pyrrolidino, e.g. dimethylpyrrolidino, (lower alkoxy)pyrrolidino, e.g. ethoxypyrrolidino, 2- or 3-pyrrolidyl, 2- or 3-(N-lower alkylpyrrolidyl), e.g. 2- or 3-(N-methylpyrrolidyl), morpholino, (lower alkyl)morpholino, e.g. N-methylmorpholino or 2-methylmorpholino, di(lower alkyl)morpholino, e.g. 2,3-dimethylmorpholino, (lower alkoxy)morpholino, e.g. ethoxymorpholino, thiamorpholino, (lower alkyl)thiamorpholino, e.g. N-methylthiamorpholino or 2-methylthiamorpholino, di(lower alkyl)thiamorpholino, e.g. 2,3-dimethylthiamorpholino, (lower alkoxy)thiamorpholino, e.g. 2-methoxythiamorpholino, piperazino, (lower alkyl)piperazino, e.g. $N^1$-methylpiperazino, 2-methylpiperazino or $N^1$-methylpiperazino, di(lower alkyl)piperazino, e.g. 2,3-dimethylpiperazino, hexamethyleneimino and homopiperazino.

The particularly preferred compounds are those wherein R is hydrogen or chloro, A is ethylene or propylene and B is di(lower alkyl)amino, especially dimethylamino.

The bases of Formula I form acid addition salts with the common inorganic and organic acids. Such inorganic salts as the hydrohalides, e.g. hydrobromide, hydrochloride, hydroiodide, sulfates, nitrates, phosphates, borates, etc., and organic salts as acetate, oxalate, tartrate, malate, citrate, succinate, benzoate ascorbate, salicylate, theophyllinate, camphorsulfonate, alkanesulfonate, e.g. methanesulfonate, benzenesulfonate, toluenesulfonate and the like are also within the scope of the invention.

The products of Formula I are produced by the following sequence of reactions: an acid of the formula (III) 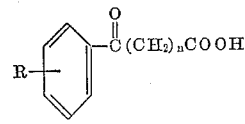

e.g. a benzoylpropionic acid, benzoylbutyric acid or benzoylvaleric acid, is converted to the chloro ester of the formula (IV) 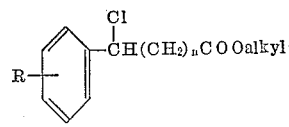

e.g. by treatment seqeuentially with sodium borohydride, thionyl chloride, and a lower alkanol such as ethanol, then reacted with an alkali metal salt of a 2-aminobenzenethiol to produce (V) 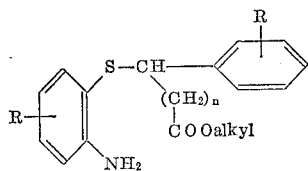

hydrolyzed, e.g. with a mineral acid such as HCl, to obtain (VI) 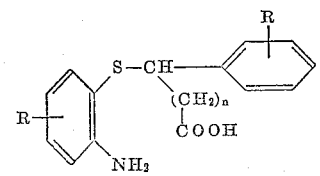

as the acid salt, and cyclized, e.g. with thionyl chloride, to form (VII)

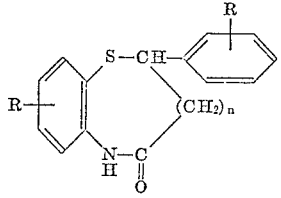

The basic group is then introduced on the ring nitrogen atom, e.g. by reaction with a (VIII)       B—A-halide preferably the chloride, sodamide and a hydrohalic acid such as hydrochloric acid. The acid addition salts are formed by reaction of the base with an excess of the appropriate acid. The symbols in the structural formulas have the same meaning as defined above.

Suitable reactants for the preparation of the compounds of this invention include for example, benzoylpropionic acid, benzoylbutyric acid or benzoylvaleric acid and their derivatives substituted in the phenyl ring with a lower alkyl, lower alkoxy, halo or trihalomethyl group, e.g. chlorobenzoylpropionic acid, bromobenzoylbutyric acid, etc. 2-aminobenzenethiol, 2-amino(lower alkyl)-benzenethiols, such as 2-aminotoluenethiols, e.g. 2-amino-p-toluenethiol, 2 - aminoethylbenzenethiols, 2 - amino-n-propylbenzenethiols, 2 - aminoisopropylbenzenethiols, 2-aminobutylbenzenethiols and 2-aminohexylbenzenethiols, 2-amino(lower alkoxy) benzenethiols, such as 2-aminomethoxybenzenethiols, e.g. 2-amino - p - anisolethio, 2-aminoethoxybenzenethiols, 2-amino - n - propoxybenzenethiols and 2-aminopentoxybenzenethiols, 2-aminonitrobenzenethiols, e.g. 2-amino-3-nitrobenzenethiol, 2-aminohalobenzenethiols, such as 2-aminochlorobenzenethiols, e.g. 2-amino-4-chlorobenzenethiol, 2-aminobromobenzenethiols and 2-aminofluorobenzenethiols, and 2-aminotrifluoromethylbenzenethiols, such as 2-amino-4-trifluoromethylbenzenethiol.

The compounds of this invention are central depressants and are useful as tranquilizers. They may be administered orally or parenterally in the form of tablets, capsules, elixirs, injectables or the like by incorporating the appropriate dosage of the base of Formula I or a physiologically acceptable acid addition salt thereof in a conventional vehicle according to accepted pharmaceutical practice.

The following examples are illustrative of the invention. All temperatures are expressed on the centigrade scale.

EXAMPLE 1

*3,4-Dihydro-2-Phenyl-2H-1,6-Benzothiazocin-5(6H)-One*

(a) *Preparation of ethyl 4-chloro-4-phenylbutyrate.*—To a solution of 95 g. of 3-benzoylpropionic acid in 530 ml. of ethanol is added dropwise a solution of 33 g. of sodium borohydride in 530 ml. of ethanol while maintaining the temperature at 30°. The mixture is stirred for three hours at room temperature, cooled and acidified with 10% hydrochloric acid. The bulk of the ethanol is evaporated and the residue cooled and extracted with 300 ml. portions of benzene. After drying the benzene extract over magnesium sulfate, the solvent is evaporated giving 88 g. of residue. Part of this material (38 g.) is dissolved in 50 ml. of benzene and treated with 52 ml. of thionyl chloride. This mixture is refluxed for three hours, cooled and added to 200 ml. of absolute alcohol (saturated with hydrogen chloride gas). After standing for twelve hours at room temperature, the solvent is removed at reduced pressure and the residue fractionated to give 43 g. of distillate; B.P. 106–108° (0.3 mm.).

(b) *Preparation of 4-(o-aminophenylthio)-4-phenylbutyric acid, ethyl ester.*—A solution of 20 g. of material from part (a) in 115 ml. of ethanol is added to a solution containing 3.6 g. of sodium hydroxide, 25 ml. of water, 11.0 g. of 2-aminobenzenethiol and 210 ml. of ethanol. The mixture is refluxed for two hours in an atmosphere of nitrogen for two hours. The mixture is cooled and the precipitated sodium chloride is filtered from the solution. The filtrate is concentrated and the residue is cooled and treated with 500 ml. of ether. After washing with 50 ml. of water, the ether phase is dried over magnesium sulfate, filtered and the filtrate concentrated. Distillation of the residue gives 22 g. of product; B.P. 172–179° (0.1 mm.).

(c) *Preparation of 4-(o-aminophenylthio)-4-phenylbutyric acid, hydrochloride.*—A mixture of 11 g. of material from part (c) and 50 ml. of 20% hydrochloric acid is stirred and heated on a steam bath for thirty minutes. After cooling, the crystalline solid is filtered and dried. The material weighed 10 g., M.P. 162–164°.

(d) *Preparation of 3,4-dihydro-2-phenyl-2H-1,6-benzothiazocin-5(6H)-one.*—A mixture of 8.5 g. of material from part (c), 135 ml. of chloroform and 26 ml. of thionyl chloride is refluxed for 45 minutes and the solvents then removed under reduced pressure. The residue is cooled and treated with 250 ml. of ether and 100 ml. of water. The solid is filtered and dried, weight 2.6 g., M.P. about 215°. After crystallization from acetonitrile, the product melts at 228–230°.

By substituting 2-amino-4-trifluoromethylbenzenethiol and 2-amino-5-methoxybenzenethiol for the 2-aminobenzenethiol in part (b) above, 3,4-dihydro-8-trifluoromethyl-2-phenyl-2H-1,6-benzothiazocin-5(6H) - one and 3,4-dihydro-9-methoxy-2-phenyl-2H-1,6 - benzothiazocin-5(6H)-one are formed respectively.

EXAMPLE 2

*6-(2-Dimethylaminoethyl)-3,4-Dihydro-2-Phenyl-2H-1,6-Benzothiazocin-5(6H)-One*

A suspension of 4.0 g. of material from part (d) of Example 1 in 60 ml. of toluene is added to a slurry of 0.4 g. of sodamide in 60 ml. of toluene. The mixture is warmed to 35–40° and the resulting solution treated with a solution of 2.5 g. of 2-dimethylaminoethyl chloride in 13 ml. of toluene. This mixture is maintained at 80° for four hours, cooled and treated with 15 ml. of water. The mixture is filtered to remove a small amount of unreacted starting material. The layers of the filtrate are separated and the organic phase is washed with 10 ml. of water and then extracted with a cold solution of 2.5 ml. of conc. hydrochloric acid in 30 ml. of water. The aqueous phase is cooled and treated with a solution of 1.5 g. of sodium hydroxide in 5 ml. of water. The liberated product as the free base is extracted three times with 100 ml. portions of ether and the combined ether phase dried over magnesium sulfate. After evaporation of the solvent, the residue (3.9 g.) is dissolved in 12 ml. of absolute alcohol and treated with 2.2 ml. of 6 N alcoholic hydrogen chloride. The resulting solution is diluted with anhydrous ether until the solution becomes turbid. Cooling this solution yields 3.7 g. of colorless hydrochloride, M.P. 216–218°.

Recrystallization from 25 ml. of acetonitrile gives 2.6 g. of product, M.P. 217–219°.

The reaction of 3,4-dihydro-8-trifluoromethyl-2-phenyl-2H-1,6-benzothiazocin - 5(6H)-one and 3,4-dihydro-9-methoxy-2-phenyl-2H-1,6-benzothiazocin-5(6H)-one with 2-dimethylaminoaminoethyl chloride as described above yields 6-(2-dimethylaminoethyl)-3,4-dihydro-8-trifluoromethyl-2-phenyl-2H-1,6-benzothiazocin-5(6H)-one hydrochloride and 6-(2-dimethylaminoethyl)-3,4-dihydro-9-methoxy-2-phenyl-2H-1,6-benzothiazocin-5(6H)-one hydrochloride, respectively.

EXAMPLE 3

*6-(2-Diethylaminoethyl)-3,4-Dihydro-2-Phenyl-2H-1,6-Benzothiazocin-5(6H)-One*

Substitution of 3.1 g. of 2-diethylaminoethyl chloride for the 2-dimethylaminoethyl chloride in Example 2 gives 6-(2-diethylaminoethyl) - 3,4 - dihydro-2-phenyl-2H-1,6-benzothiazocin-5(6H)-one and its hydrochloride, respectively.

EXAMPLE 4

*8-Chloro-3,4-Dihydro-2-Phenyl-2H-1,6-Benzothiazocin-5(6H)-One*

Substitution of 14.0 g. of 4-chloro-2-aminobenzenethiol for 2-aminobenzenethiol in part (*b*) of Example 1, followed by the hydrolysis and cyclization procedure of part (*c*) and (*d*) gives 8-chloro-3,4-dihydro-2-phenyl-2H-1,6-benzothiazocin-5(6H)-one.

EXAMPLE 5

*6-(2-Dimethylaminoethyl)-8-Chloro-3,4-Dihydro-2-Phenyl-2H-1,6-Benzothiazocin-5(6H)-One*

Substitution of 4.2 g. of material from Example 4 for the 3,4-dihydro-2-phenyl-2H-1,6-benzothiazocin-5(6H)-one in Example 2 gives 6-(2-dimethylaminoethyl)-8-chloro-3,4-dihydro - 2 - phenyl - 2H-1,6-benzothiazocin-5(6H)-one and its hydrochloride, respectively.

EXAMPLE 6

*2,3,4,5-Tetrahydro-2-Phenyl-1,7-Benzothiazonin-6(7H)-One*

Replacement of the 3-benzoylpropionic acid of part (*a*) of Example 1 by 4-benzoylbutyric acid [J.A.C.S. 69, 3018 (1947)] gives ethyl 5-chloro-5-phenyl valerate. The reaction of this material with 2-aminobenzenethiol, followed by hydrolysis and cyclization according to the procedure of parts (*b*), (*c*) and (*d*) of Example 1 gives 2,3,4,5-tetrahydro-2-phenyl-1,7-benzothiazonin-6(7H)-one.

EXAMPLE 7

*7-(2-Dimethylaminoethyl)-2,3,4,5-Tetrahydro-2-Phenyl-1,7-Benzothiazonin-6(7H)-One, Hydrochloride*

Reaction of the material from Example 6 with 2-dimethylaminoethyl chloride according to the procedure used in Example 2 gives 7-(2-dimethylaminoethyl)-2,3,4,5-tetrahydro-2-phenyl-1,7-benzothiazonin-6(7H)-one and its hydrochloride, respectively.

EXAMPLE 8

*2,3,4,5-Tetrahydro-2-(p-Methoxyphenyl)-2H-1,8-Benzothiazecin-7(8H)-One*

Replacement of 3-benzoylpropionic acid of part (*a*) of Example 1 by 5-(p-methoxybenzoyl)valeric acid [J.A.C.S. 69, 3018 (1947)] gives ethyl 6-chloro-6-(p-methoxyphenyl)-caproate. The reaction of this material with 2-aminobenzenethiol, followed by hydrolysis and cyclization according to the procedure of parts (*b*), (*c*) and (*d*) of Example 1 gives 2,3,4,5-tetrahydro-2-(p-methoxyphenyl)-2H-1,8-benzothiazecin-7(8H)-one.

EXAMPLE 9

*8-(2-Dimethylaminoethyl)-2-(p-Methoxyphenyl)-2,3,4,5-Tetrahydro-2H-1,8-Benzothiazecin-7(8H)-One, Hydrochloride*

Reaction of the material from Example 8 with 2-dimethylaminoethyl chloride according to the procedure used in Example 2 gives 8-(2-dimethylaminoethyl)-2-(p-methoxyphenyl)-2,3,4,5 - tetrahydro-2H-1,8-benzothiazecin-7(8H)-one and its hydrochloride, respectively.

EXAMPLE 10

By substitution of equivalent quantities of 2-morpholinoethyl chloride, 2-pyrrolidinoethyl chloride, and 3-(4-methylpiperazino)propyl chloride in place of the 2-dimethylaminoethyl chloride in Example 2 gives 6-(2-morpholinoethyl)-3,4-dihydro-2-phenyl - 2H-1,6 - benzothiazocin-5(6H)-one hydrochloride, 6-(2-pyrrolidinoethyl)-3,4-dihydro-2-phenyl-2H-1,6-benzothiazocin - 5(6H)-one hydrochloride, and 6-[3-(4-methylpiperazino) - propyl]-3,4-dihydro-2-phenyl-2H-1,6-benzothiazocin - 5(6H)-one hydrochloride, respectively.

What is claimed is:

1. A compound of the formula

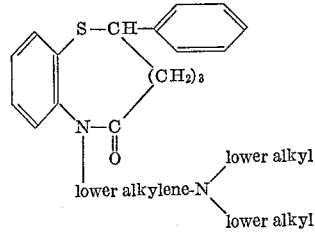

2. A compound of the formula

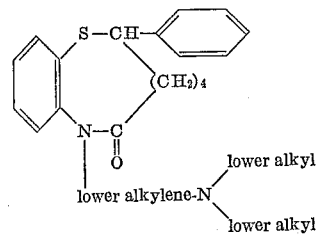

3. 7-(2-dimethylaminoethyl) - 2,3,4,5 - tetrahydro-2-phenyl-1,7-benzothiazonin-6(7H)-one.

4. 8-(2-dimethylaminoethyl) - 2 - (p-methoxyphenyl)-2,3,4,5-tetrahydro-2H-1,8-benzothiazecin-7(8H)-one.

5. A process for the production of a compound of the formula:

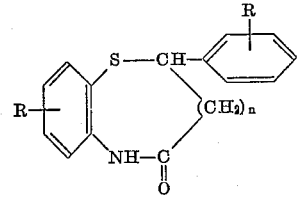

wherein R is a member of the group consisting of hydrogen, lower alkyl, lower alkoxy, nitro, halo and trihalomethyl, and *n* is an integer from 2 to 4, which comprises cyclizing a compound of the formula:

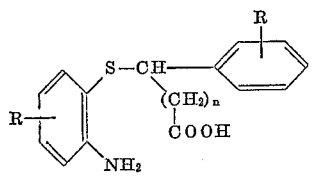

where R and *n* are as above defined, by heating with thionyl chloride.

6. A process for the production of 3,4-dihydro-2-phenyl-2H-1,6-benzothiazocin-5(6H)-one which comprises heating 4-(o-aminophenylthio)-4-phenylbutyric acid with thionyl chloride.

References Cited in the file of this patent

UNITED STATES PATENTS

| | | |
|---|---|---|
| 2,824,102 | Zimmermann | Feb. 18, 1958 |
| 3,006,916 | Winthrop et al. | Oct. 31, 1961 |
| 3,029,251 | Fancher et al. | Apr. 10, 1962 |
| 3,075,967 | Krapcho | Jan. 29, 1963 |

OTHER REFERENCES

Mills et al.: J. Chem. Soc., 1927, p. 2742.
Mayer et al.: Berichte, vol. 56 (1923), page 1418.
Kimura et al.: Chem. Abstracts, vol. 47 (1953), page 6359.
Migrdichian: Organic Synthesis, Reinhold Pub. Corp., New York (1957), pages 835–6.